United States Patent
Buerkle et al.

(10) Patent No.: US 11,111,844 B2
(45) Date of Patent: Sep. 7, 2021

(54) METHOD FOR OPERATING A COMBUSTION ENGINE SYSTEM

(71) Applicant: BMTS Technology GmbH & Co. KG, Stuttgart (DE)

(72) Inventors: Michael Buerkle, Fellbach (DE); Hartmut Weiss, Stuttgart (DE)

(73) Assignee: BMTS TECHNOLOGY GMBH & CO. KG

(*) Notice: Subject to any disclaimer, the term of this patent is extended or adjusted under 35 U.S.C. 154(b) by 0 days.

(21) Appl. No.: 16/663,801

(22) Filed: Oct. 25, 2019

(65) Prior Publication Data

US 2020/0131981 A1 Apr. 30, 2020

(30) Foreign Application Priority Data

Oct. 26, 2018 (DE) .......................... 102018218406.2

(51) Int. Cl.
*F02B 37/24* (2006.01)
*F02B 37/18* (2006.01)
(Continued)

(52) U.S. Cl.
CPC ............ *F02B 37/24* (2013.01); *F02B 37/183* (2013.01); *F01N 3/2053* (2013.01); *F02C 6/12* (2013.01); *F02C 9/18* (2013.01); *F05D 2220/40* (2013.01)

(58) Field of Classification Search
CPC ............... F01N 13/009; F01N 2410/00; F01N 2410/03; F01N 2410/06; F01N 2430/00;
(Continued)

(56) References Cited

U.S. PATENT DOCUMENTS 6,497,095 B2* 12/2002 Carberry ................. F01N 9/002
60/295
6,519,931 B2* 2/2003 Fujieda ..................... F01N 3/20
60/280
(Continued)

FOREIGN PATENT DOCUMENTS

DE 198 33 619 A1 1/2000
DE 10 2005 021 096 A1 11/2005
(Continued)

OTHER PUBLICATIONS

European Search Report dated Apr. 17, 2020 related to corresponding European Application No. EP19200204.6.
(Continued)

*Primary Examiner* — Jesse S Bogue
(74) *Attorney, Agent, or Firm* — Fishman Stewart PLLC

(57) ABSTRACT

The present disclosure relates to a combustion engine system and a method of operation thereof. The combustion engine system includes a pollutant conversion system and an exhaust gas turbocharger that includes a variable turbine geometry and a waste gate valve. The variable turbine geometry includes adjustable guide elements surrounding the turbine wheel in a circumferential direction and are arranged to define an overall cross-section in their respective position for the exhaust gas. In a control mode where the pollutant conversion system comprises a temperature above a threshold temperature, the guide elements are adjusted such that the overall cross-section is between a control minimum value and a control maximum value. In a heat-up mode at temperatures of the pollutant conversion system below the threshold temperature, the guide elements are moved to a heat-up position where the overall cross-section is smaller than the control minimum value.

19 Claims, 4 Drawing Sheets

(51) Int. Cl.
*F01N 3/20* (2006.01)
*F02C 6/12* (2006.01)
*F02C 9/18* (2006.01)

(58) Field of Classification Search
CPC ......... F01N 2900/08; F01N 2900/1404; F01N 2900/1602; F01N 2900/1626; F01N 3/2006; F01N 3/2053; F01N 3/2882; F01N 5/04; F01N 9/00; F02B 37/10; F02B 37/14; F02B 37/18; F02B 37/183; F02B 37/24; F02B 39/10; F02C 6/12; F02C 9/18; F02D 2200/0802; F02D 41/0007; F02D 41/0245; F02D 41/0255; F05D 2220/40; Y02T 10/12; Y02T 10/40
See application file for complete search history.

(56) References Cited

U.S. PATENT DOCUMENTS

| | | | |
|---|---|---|---|
| 7,261,086 B2 * | 8/2007 | Nuang | F02D 41/3035 |
| | | | 123/436 |
| 9,388,771 B2 * | 7/2016 | Murakami | F02B 37/18 |
| 2005/0060999 A1 | 3/2005 | Mulloy et al. | |
| 2005/0188682 A1 * | 9/2005 | Fledersbacher | F01N 3/0236 |
| | | | 60/284 |
| 2018/0003118 A1 * | 1/2018 | zur Loye | F02D 41/0025 |

FOREIGN PATENT DOCUMENTS

| | | |
|---|---|---|
| DE | 102010043327 A1 | 5/2012 |
| DE | 10 2013 001 453 A1 | 7/2014 |
| EP | 1 243 767 A2 | 9/2002 |
| EP | 1 396 619 A1 | 3/2004 |
| EP | 1 749 990 A2 | 2/2007 |
| EP | 3225824 A2 | 10/2017 |
| GB | 2413830 A | 11/2005 |
| WO | 05/098222 A1 | 10/2005 |

OTHER PUBLICATIONS

English abstract for EP-1 396 619.
English abstract for DE-19833619.
English abstract for DE-10 2013 001 453.

* cited by examiner

METHOD FOR OPERATING A COMBUSTION ENGINE SYSTEM

CROSS-REFERENCE TO RELATED APPLICATION

This application claims priority to German Application No. DE 10 2018 218 406.2 filed on Oct. 26, 2018, the contents of which are hereby incorporated by reference in its entirety.

TECHNICAL FIELD

The present invention relates to a method for operating a combustion engine system with a combustion engine, an exhaust gas turbocharger and a pollutant conversion system. The invention further relates to a combustion engine system which is operated in this manner.

BACKGROUND

The increase in efficiency and the reduction of pollutant emissions play important roles in the development of combustion engine systems.

As regards an increase in efficiency it is known to use an exhaust gas turbocharger, which comprises a turbine wheel incorporated into an exhaust gas system of the combustion engine system, the turbine wheel being driven by the exhaust gas from the combustion engine, and a compressor wheel incorporated into a fresh air system of the combustion engine system in order to compress fresh air to be fed to the combustion engine. Regulating the exhaust gas turbocharger is normally effected using a waste gate valve and/or a variable turbine geometry, which are capable of varying the effect of the exhaust gas upon the turbine wheel.

Pollutant emissions are normally reduced using pollutant conversion systems, which in the exhaust system lead to a reduction of the pollutants in the exhaust gas. Such pollutant conversion systems as a rule comprise a threshold temperature above which a reduction in pollutants begins. Below this threshold temperature no such reduction or a lesser reduction of pollutants in comparison to the threshold temperature takes place in the pollutant conversion system. Therefore if the temperature in the pollutant conversion system is below the threshold temperature, the amount of pollutants in the ejected exhaust gas is increased, which leads to a poorer environmental balance of the combustion engine system.

A combustion engine system of this kind is known from the EP 1 243 767 A2. The exhaust gas turbocharger here comprises a waste gate valve which is adjustable and, when in a bypass position, guides the exhaust gas past the turbine wheel via a bypass channel. In the bypass position of the waste gate valve therefore the exhaust gas arrives at the pollutant conversion system arranged downstream of the bypass channel at an increased temperature, so that the pollutant conversion system in this position of the waste gate valve reaches the threshold temperature faster.

A similar approach is pursued in the DE 198 33 619 A1. In this combustion engine system two bypass channels bypassing the turbine wheel are provided, wherein a primary catalytic converter is provided in one of the bypass channels in addition to the pollutant conversion system arranged downstream of the bypass channels.

The EP 1 396 619 A1 has disclosed a combustion engine system, which in essence corresponds to the combustion engine system shown in the EP 1 243 767 A2, the difference being that the exhaust gas turbocharger is further provided with a variable turbine geometry. In order for the pollutant conversion system to reach the threshold temperature the waste gate valve is moved into the bypass position.

SUMMARY

The present invention is engaged in the objective to propose improved or at least other embodiments for a method to operate a combustion engine system as well as for a combustion engine system operated in this way, which are characterised, in particular, by increased efficiency and/or an improved environmental balance.

According to the invention this objective is achieved by the subjects of the independent claims. Advantageous embodiments are the subject of the depending claims.

The present invention is based on the general idea, for a combustion engine system comprising a combustion engine and an exhaust gas turbocharger as well as a pollutant conversion system, of closing a variable turbine geometry of the exhaust gas turbocharger in order to achieve a threshold temperature of the pollutant conversion system, beyond a minimum position of the variable turbine geometry provided for when the variable turbine geometry is in control mode, the minimum position defining a minimum through-flow for the variable turbine geometry, in order to further reduce, in particular interrupt, the through-flow through the turbine. Consequently the exhaust gas reaches the pollutant conversion system with an increased enthalpy, in particular due to reduced/absent heat losses and/or kinetic losses incurred during impaction of the turbine wheel, so that the pollutant conversion system reaches the threshold temperature faster. The threshold temperature defines a temperature of the pollutant conversion system, above which pollutants are reduced in the pollutant conversion system and/or below which a reduced, or no reduction, in pollutants takes place. With the solution according to the invention therefore the pollutant conversion system realises a reduction in pollutants faster, so that fewer pollutants are ejected, thereby achieving an improved environmental balance of the combustion engine system. Reaching the threshold temperature faster also has the effect that the exhaust gas turbocharger can be operated faster in control mode, in particular in that recharging/compressing of the fresh air to be supplied from the combustion engine is taking less time so that the efficiency of the combustion engine system is improved.

According to the inventive idea the combustion engine system comprises the combustion engine, the exhaust gas turbocharger as well as the pollutant conversion system. The combustion engine system further comprises a fresh air system for feeding fresh air to the combustion engine as well as an exhaust gas system for dissipating the exhaust gas. The exhaust gas turbocharger, apart from the turbine wheel, comprises a compressor wheel incorporated into the fresh air system, which is driven by the turbine wheel incorporated into the exhaust gas system. The exhaust gas turbocharger further comprises an adjustable waste gate valve which can be adjusted between a closed position and an open position or bypass position. When the waste gate valve is in the bypass position exhaust gas is guided through a bypass channel bypassing the turbine wheel. The pollutant conversion system serves to reduce the pollutants in the exhaust gas and is conveniently incorporated into the exhaust gas system. The pollutant conversion system comprises the threshold temperature, above which pollutants in the pollutant conversion system are reduced. The variable turbine geometry of the exhaust gas turbocharger comprises guide elements which surround the turbine wheel in a circumferential direction and which are adjustable, wherein the guide elements are successively arranged in circumferential direction, forming an overall cross-section in the respective position through which the exhaust gas flows. In control mode of the combustion engine system, in which the pollutant conversion system has a temperature above the threshold temperature, the variable turbine geometry is operated in such a way that the guide elements form an overall cross-section, which has a value between a control minimum and the control maximum. When in control mode the overall cross-section corresponds to at least the control minimum value. The corresponding position of the variable turbine geometry is also known as the so-called minimum flow position. According to the invention the combustion engine system by contrast is operated in heat-up mode if the temperature of the pollutant conversion system is below the threshold temperature. In contrast to the control mode the variable turbine geometry is adjusted in heat-up mode by the guide elements in such a way that the overall cross-section formed by the guide elements is smaller than the control minimum value. Consequently no part or at least a reduced part of the exhaust gas reaches the turbine wheel so that respective enthalpy losses, in particular heat losses, of the exhaust gas are reduced. Therefore the exhaust gas reaches the pollutant conversion system with an increased enthalpy, in particular at a raised temperature, so that the pollutant conversion system reaches the threshold temperature faster. The reduced flow of exhaust gas to the turbine wheel further has the effect that the compressor wheel represents a greater resistance, in particular acts as a throttle, for the fresh air flowing through the fresh air system. This leads to an increase in the amount of fuel in a fresh-air-and-fuel mixture which is fed to the combustion engine, in particular without further measures. As a result a larger amount of unburned fuel reaches the exhaust gas system so that this is post-combusted in the exhaust gas system, in particular in the pollutant conversion system. In consequence heating up of the pollutant conversion system is accelerated.

In contrast to the known variable turbine geometries known from the state of the art and their methods of operation, in which the guide elements, in their respective positions, form an overall through-flow cross-section for exhaust gas to flow in direction of the turbine wheel, which does not drop below a minimum corresponding to the control minimum value in order to always allow the exhaust gas to leave the combustion engine and thus to be able to operate it in particular even when idling, this control minimum value/the respective position of the guide elements, also known as minimum flow position, is maintained here in control mode and not reached in heat-up mode, in particular is reduced to zero. This leads to the pollutant conversion system heating up faster in heat-up mode.

The pollutant conversion system is conveniently arranged downstream of the turbine wheel of the exhaust gas turbocharger. In this way, when in control mode, exhaust gas reaches the turbine wheel with an increased enthalpy so that the exhaust gas turbocharger is operated more efficiently.

The pollutant conversion system is conveniently arranged downstream of the exhaust gas system. Thus exhaust gas which has bypassed the turbine wheel via the bypass channel also reaches the pollutant conversion system.

The waste gate valve is conveniently movable between the bypass position and a closed position, in which the bypass channel is closed and in which exhaust gas flows in direction of the turbine wheel, in particular via the variable turbine geometry.

The control minimum value/the associated position of the guide elements, i.e. in particular the so-called minimum flow position, corresponds to an overall cross-section, which in control mode of the combustion engine permits/ensures operation, in particular faster operation of the combustion engine.

The pollutant conversion system is preferably designed so as to reduce the pollutants in the exhaust gas by means of conversion. This is preferably effected by a reaction of constituents contained in the exhaust gas and/or by constituents introduced into the exhaust gas. These are in particular oxidation and/or reduction reactions. The pollutant conversion system preferably comprises a catalyser for this purpose, which sets the threshold temperature/operation temperature, in particular corresponds to the same. The threshold temperature advantageously corresponds to an operating temperature of the pollutant conversion system, in particular the catalyser, below which the conversion rate of the pollutant conversion system is considerably reduced. Alternatively the threshold temperature may correspond to a starting temperature of the pollutant conversion system, in particular the catalyser, at which conversion of the pollutants starts or begins.

Pollutants are predominantly understood to mean carbon monoxide, nitric oxides also called NOx, and similar.

Heating up of the combustion engine system takes place, as described above, when the pollutant conversion system, in particular the catalyser of the pollutant conversion system, has a temperature below the threshold temperature. This is the case in particular when the combustion engine system undergoes a cold start, wherein the pollutant conversion system is at ambient temperature. It is also feasible that the temperature of the pollutant conversion system, in particular the catalyser, drops below the threshold temperature when the combustion engine system is running, in particular when it is idling and/or when ambient temperatures are very low. Even in these circumstances the combustion engine system can change into heat-up mode.

When the pollutant conversion system reaches the threshold temperature and/or exceeds the threshold temperature, the combustion engine system is conveniently operated in control mode.

The guide elements of the variable turbine geometry may in principle be designed at random, insofar as they are adjustable, surround the turbine wheel and in their respective position form a through-flow cross-section for the exhaust gas in direction of the turbine wheel. The guide elements are advantageously formed as guide vanes.

Advantageous embodiments are those, in which the variable turbine geometry is closed in heat-up mode, such that the guide elements, apart from respective tolerances, form a closed surface in circumferential direction. Consequently, apart from the said tolerances and/or undesirable leakages, no exhaust gas flows to the turbine wheel. Thus the amount of exhaust gas flowing to the pollutant conversion system is maximised, so that this reaches the threshold temperature faster. Conveniently in this case the waste gate valve is moved into the bypass position in order to ensure that the exhaust gas flow to the pollutant conversion system is as unobstructed as possible. This also ensures sufficient dissipation of the exhaust gas from the combustion engine.

Preferably the waste gate valve, in heat-up mode, frees the cross-flow section of the bypass channel to its maximum extent, in particular is opened to its maximum extent/opened so as to ensure that the pollutant conversion system is exposed to the bypass mass current. This leads to a minimisation of the hindrances due to the waste gate valve, in particular resistances, for the exhaust gas so that the exhaust gas reaches the pollutant conversion system with maximum possible enthalpy. "Opened to its maximum extent" therefore means in particular that the exhaust gas flows as far as possible unobstructedly past the waste gate valve and/or through the bypass channel to the pollutant conversion system.

Since in the closed position of the variable turbine geometry compression of the air in the fresh air system is prevented with the aid of the turbine wheel in heat-up mode, the combustion engine is operated in heat-up mode like a kind of suction motor. This is the case in particular when the combustion engine is idling.

When the load requirement from the combustion engine increases, the combustion engine system can be conveniently operated in the conventional cold start mode, which means that the waste gate valve and the variable turbine geometry are adjusted in accordance with the load requirements. Load requirement in the present case is understood to mean in particular the torque to be made available by the combustion engine.

Alternatively it is feasible to equip the combustion engine system with an electric motor, with which the air in the fresh air system can be compressed. In this case the electric motor can, in operation, drive the compressor wheel of the exhaust gas turbocharger and/or an additional compressor separate from the compressor wheel for compressing the air. If the load requirement from the combustion engine exceeds a threshold value, also called first threshold value, the electric motor is operated in order to compress the air in the fresh air system. The first threshold value is conveniently chosen such that it lies above the load requirement, which the combustion engine can make available in heat-up position of the guide elements and in bypass position of the waste gate valve. In this case the combustion engine system continues to be operated in heat-up mode and the electric motor is additionally activated in order to satisfy the load requirement above the first threshold value by compressing the air. When the load requirement drops below the first threshold value the electric motor may be deactivated.

Preferred embodiments provide that in case of a greater load requirement from the combustion machine, i.e. in case the load requirement exceeds a second threshold value which is greater than the first threshold value, the combustion engine system is operated in the conventional cold start mode, which means that the waste gate valve and the variable turbine geometry are adjusted according to the load requirements, that the variable turbine geometry is therefore no longer in a completely closed state. The electric motor may then continue to operate.

If the load requirement drops below the second threshold value and the pollutant conversion system has a temperature which is below the threshold temperature, the combustion engine system is preferably operated again in heat-up mode, wherein the electric motor is operated when the load requirement exceed the first threshold value.

When changing from heat-up mode into control mode and/or into the conventional cold start mode, the waste gate valve and the variable turbine geometry are preferably adjusted such that the torque and the rotational speed of the combustion engine follow a course which is as continual as possible, i.e. a course without jumps. Sudden or abrupt changes in the operation of the combustion engine are just avoided or at least reduced. This results in increased comfort for a user of the combustion engine system.

Similarly activation and deactivation of the electric motor preferably occur such that the torque and rotational speed of the combustion engine follow as far as possible a continual course, i.e. a course without jumps. Sudden or abrupt changes in the operation of the combustion engine are just avoided or at least reduced. This results in increased comfort for a user of the combustion engine system.

With preferred embodiments the waste gate valve is opened as early as prior to starting the combustion engine, in particular prior to the cold start. Alternatively or additionally the variable turbine geometry is advantageously closed prior to the cold start, particularly preferably closed completely. This leads to a quicker and/or more efficient heating up in the subsequent heat-up mode so that the environmental balance is improved.

A further improvement in environmental balance of the combustion engine system can be achieved by arranging an auxiliary pollutant reducing system in the exhaust gas system, in particular upstream of the pollutant conversion system such that exhaust gas flowing through the bypass flows through the auxiliary pollutant reducing system. To this end the auxiliary pollutant reducing system may be arranged in the bypass channel, upstream thereof or downstream thereof and upstream of the pollutant conversion system. The auxiliary pollutant reducing system is designed such that an operating temperature of the auxiliary pollutant reducing system is achieved faster than the threshold temperature of the pollutant conversion system. This is realised in particular by dimensioning the auxiliary pollutant reducing system in a smaller manner. In particular the auxiliary pollutant reducing system may comprise a catalyser, which is of corresponding smaller dimensions than the catalyser of the pollutant conversion system. Consequently a reduction in pollutants in the exhaust gas is achieved before the pollutant conversion system reaches its threshold temperature.

It is understood that apart from the method for operating the combustion engine system, a combustion engine system operated in this way also falls within the scope of the invention.

To this end the combustion engine system may comprise a corresponding control system, which is communicatively connected to the exhaust gas turbocharger, in particular to the variable turbine geometry. The control system is advantageously communicatively connected also to the waste gate valve.

It is feasible to provide the variable turbine geometry with a mechanical stop, which defines the control minimum value in control mode. In particular at least one of the guide elements and/or an adjustment device adjusting the guide elements hits this stop, so that the overall cross-section formed by the guide elements cannot drop below the control minimum value. The stop is preferably adjustable and in heat-up mode is moved such that in the heat-up position the overall cross-section is smaller than the control minimum value.

The combustion engine system may comprise at least one temperature sensor for determining the temperature of the pollutant conversion system.

Preferably the variable turbine geometry is designed such that in heat-up position at least two, preferably all guide elements following one another in circumferential direction are in contact with each other. Because the guide elements contact each other, a section preventing the through-flow of exhaust gas is created, so that as a result, the above mentioned closed surface is preferably formed in circumferential direction.

In this respect embodiments have proved to be advantageous, in which in heat-up position adjacent guide elements superimpose each other in circumferential direction. Consequently the closed surface is enlarged to its maximum extent so that the flow of exhaust gas in direction of the turbine wheel is prevented more effectively.

Especially preferred are embodiments, in which in heat-up position the respective guide element with its tip facing the guide element adjoining in circumferential direction is supported on an end section of this guide element adjoining in circumferential direction, wherein the end section of the respective guide element is a section of the guide element remote from the tip of the guide element. This leads to a further enlargement of the closed surface.

In heat-up mode the tips of the guide elements advantageously lie on the surface of the adjacent guide element facing the turbine wheel. This ensures a more reliable realisation of the heat-up position, in particular of the closed surface.

The combustion engine system and the associated operating method can be used in any random applications. It is feasible to use it in a motor vehicle, in which the combustion engine, in particular also in addition to an electrical drive, is used.

Further important features and advantages of the invention are revealed in the sub-claims, in the drawings and the associated figure description by way of the drawings.

It is understood that the above mentioned features and the features to be explained below can be used not only in the respectively mentioned combination, but also in other combinations or on their own, without departing from the scope of the invention.

Preferred exemplary embodiments of the invention are depicted in the drawings and will be explained in detail in the description below, wherein identical reference symbols refer to identical or similar or functionally identical components.

DETAILED DESCRIPTION

Figure 1:
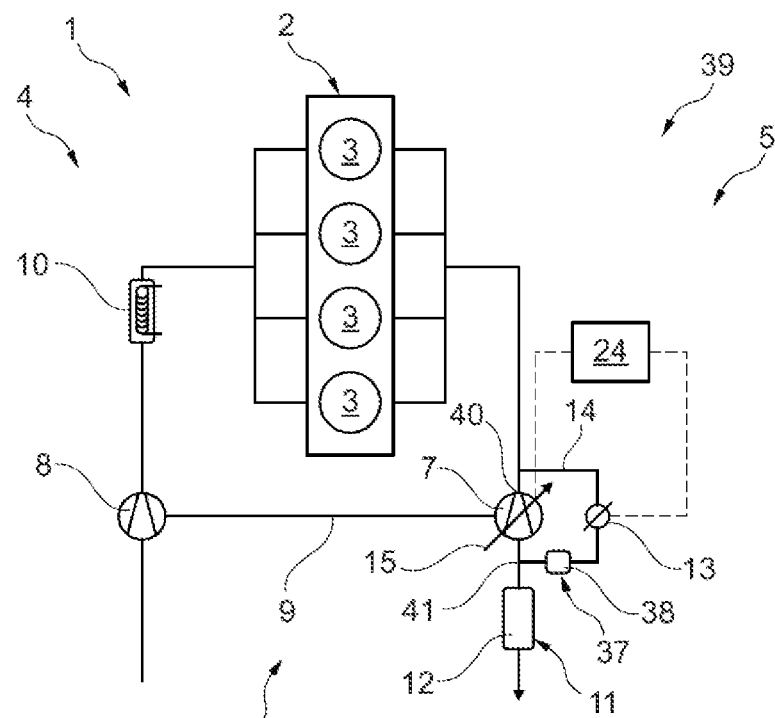
FIG. 1 a much simplified circuit-diagram-type depiction of a combustion engine system, FIG. 2 a flow diagram for explaining the operating method of the combustion engine system, FIGS. 3 and 4 a plan view of a variable turbine geometry of the combustion engine system, in different positions, respectively, FIG. 5 a much simplified circuit-diagram-type depiction of the combustion engine system for another exemplary embodiment, FIG. 6 a much simplified circuit-diagram-type depiction of the combustion engine system for further exemplary embodiment, FIG. 7 a flow diagram for demonstrating an operating procedure of the combustion engine system of FIGS. 5 and 6.

A combustion engine system 1, as depicted in FIG. 1 in a much simplified and circuit-diagram-type view, comprises a combustion engine 2, which comprises at least one combustion chamber 3, wherein in FIG. 1 the combustion engine 2 comprises, for example, four such combustion chambers 3. In operation of the combustion engine 2 fresh air is fed via a fresh air system 4 to at least one of the combustion chambers 3 and mixed with a fuel. The fresh air and fuel mixture is combusted, at least partially, in the combustion chamber 3, so that exhaust gas is created, which is dissipated via an exhaust gas system 5. The combustion engine system 1 further comprises an exhaust gas turbocharger 6, which comprises a turbine wheel 7 incorporated in the exhaust gas system 5 and a compressor wheel 8 incorporated in the fresh air system 4, as symbolically indicated respectively in FIG. 1. The turbine wheel 7 is driven by the exhaust gas and in turn drives the compressor wheel 8, which compresses the air in the fresh air system 7. This is for example done via a shaft 9 of the exhaust gas turbocharger 6, which connects the turbine wheel 7 and the compressor wheel 8 with each other. Cooling of the fresh air compressed by the compressor 8 is effected by an intercooler 10 incorporated in the fresh air system 4 downstream of the compressor wheel 8. The combustion engine system 1 further comprises a pollutant conversion system 11, which in operation reduces the amount of pollutants before the exhaust gas is dissipated. The pollutant conversion system 11 has a threshold temperature, above which, in the pollutant conversion system 11, the conversion of pollutants in the exhaust gas starts or is considerably increased by reactions of constituents present in or introduced into the exhaust gas. To this end the pollutant conversion system 11 preferably comprises a catalyser 12, which specifies or defines the said threshold temperature. The threshold temperature thus corresponds to a start temperature, at which conversion in the catalyser 12 begins are starts, and which can be between 200° C. and 300° C., or to an operating temperature of the catalyser 12, which is above the start temperature and may be between 300° C. and 1000° C.

The exhaust gas turbocharger 7 comprises a waste gate valve 13, which is movable between a closed position and a bypass position. In the bypass position of the waste gate valve 13 exhaust gas is guided past the turbine wheel 7 via a bypass channel 14 of the exhaust gas system, wherein the bypass channel 14 extends from a branch-off position 40 arranged upstream of the turbine wheel 7 as far as a return position 41 arranged downstream of the turbine wheel 7. In the example shown the pollutant conversion system 11 is incorporated in the exhaust gas system 5 downstream of the bypass channel 14. Furthermore in the example shown the waste gate valve 13 is arranged in the bypass channel 14. The exhaust gas turbocharger 7 further comprises a variable turbine geometry 15 symbolised by an arrow in FIG. 1, which is shown in a plan view in FIGS. 3 and 4. The variable turbine geometry 15 is arranged between the branch-off position 40 and the return position 41 outside the bypass channel 14.

Figure 3:
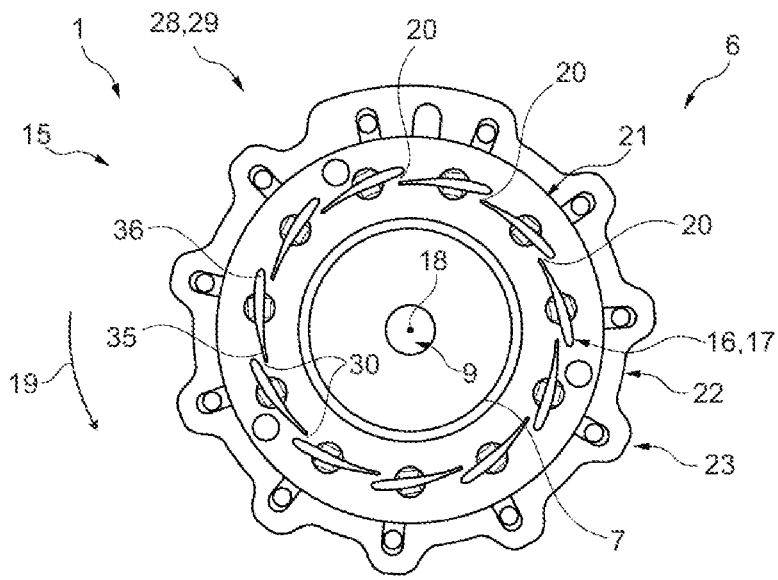
Figure 4:
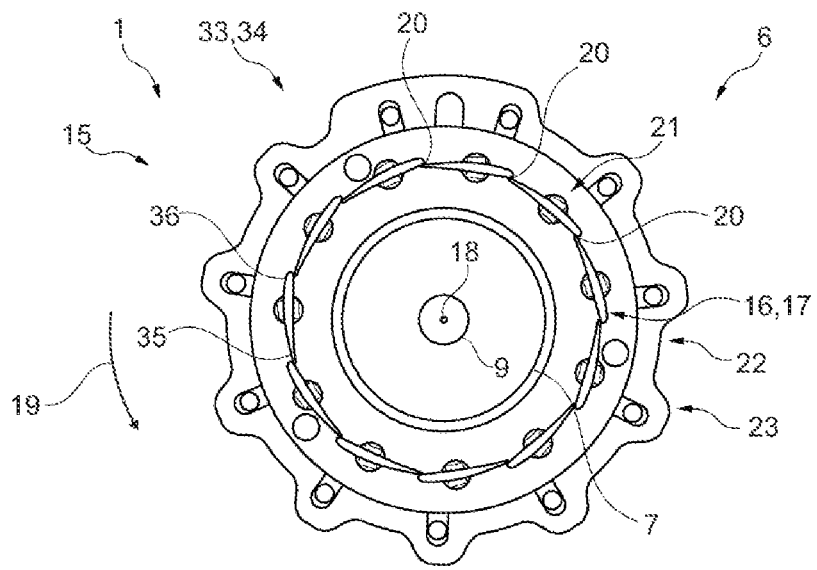

The variable turbine geometry 15 thus comprises a number of guide elements 16, which in the example shown are each formed as guide vanes 17. FIGS. 3 and 4 show a plan view of the exhaust gas turbocharger 1 in the area of the variable turbine geometry 15 in axial direction 18 of the shaft 9 as well as the turbine wheel 7, which in these figures are hinted at, respectively. The guide elements 16 of the variable turbine geometry 15 surround the turbine wheel 7 in a circumferential direction 19 and are each adjustable. A cross-section 20, through which the exhaust gas can flow in direction of the turbine wheel 7 is formed respectively between adjacent guide elements 16 (see FIG. 3), wherein the sum of all cross-sections 20 defines an overall cross-section 20, which can be changed by adjusting the guide elements 16. This means that the guide elements 16 in their respective position form an overall cross-section through which the exhaust gas can flow in direction of the turbine wheel 7. The adjustable arrangement is achieved by rotatably mounting the guide elements 16 in a vane ring 21 and adjusting them via an adjustment ring 22 of an adjustment device 23, which adjusts all guide elements 16 in common.

The combustion engine system 1 further comprises a control system 24, which as indicated by broken lines, is communicatively connected to the variable turbine geometry 15 and the waste gate valve 13, in order to control and/or adjust the same.

Figure 2:
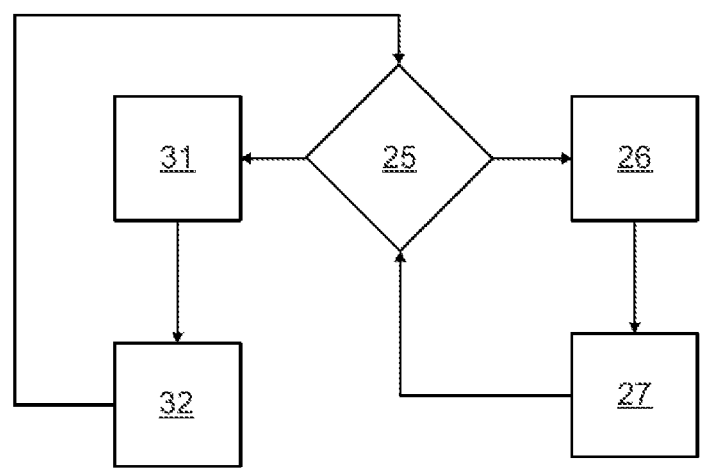

FIG. 2 shows a flow diagram, which illustrates a method for operating the combustion engine system 1, which can be accomplished with the aid of the control system 24.

In a first method step 25 a check a performed as to whether the temperature of the pollutant conversion system 11, in particular the catalyser 12, is above or below the threshold temperature. This check can be carried out with the aid of a temperature sensor not shown or in other ways, for example by way of the pollutants present in the exhaust gas downstream of the pollutant conversion system 11.

If the pollutant conversion system 11, in particular the catalyser 12, comprises a temperature, which is above the threshold temperature, the combustion engine system 1 is operated in control mode 26. In the control mode 26 the waste gate valve 13 and the variable turbine geometry 15 are adjusted according to demand, in particular adapted to the output requirements of the combustion engine 2. The variable turbine geometry 15, when in control mode 26, is set in accordance with the indicated method step 27 such that the guide elements 16 in each position form an overall cross-section, which lies between a control minimum value and a control maximum value. This means that the variable turbine geometry 15 in control mode 26 is operated such that the overall cross-section corresponds to at least a control minimum value, thereby ensuring a minimum oncoming flow for the turbine wheel 7.

A corresponding position 28 of the variable turbine geometry 15, in which the said control minimum value of the overall cross-section is formed, is shown in FIG. 3. In this position 28, also called first position 28 or minimum flow position 29 hereunder, a gap 30 forming a cross-section 20 of the kind mentioned is formed between each of the guide elements 16 and the adjacent guide element 16 in circumferential direction 19. In control mode 26 the variable turbine geometry 15 can be, or is, exclusively adjusted such that the overall cross-section corresponds to at least the control minimum value formed in the first position 18.

Subsequently the method returns to the first method step 25, so that another check is carried out, as to whether the temperature of the pollutant conversion system 11, in particular of the catalyser 12, is above or below the threshold temperature.

If the temperature of the pollutant conversion system 11, in particular of the catalyser 12, is below the threshold temperature, the combustion engine system 1 is operated in a heat-up mode 31. In heat-up mode 31 the variable turbine geometry 15 is adjusted in a method step 32 such that the overall cross-section is below the control minimum value, that is the guide elements 16 are closed further than in the first position 28 shown n FIG. 3, so that the gaps 30 are each at least smaller than in the first position 28.

A corresponding position of the variable turbine geometry 15, hereunder also called second position 33 or heat-up position 34, is shown in FIG. 4. In heat-up position 34 a reduced proportion of exhaust gas flows to the turbine wheel 7. Accordingly the amount of exhaust gas, which flows via the bypass channel 14 to the pollutant conversion system 11, is increased. As a result the enthalpy of exhaust gas, which flows through the pollutant conversion system 11, in particular the catalyser 12, also increases. In particular this leads to a reduction in the thermal and/or kinetic losses, which are due to the through-flow through the turbine wheel 7. Consequently the pollutant conversion system 11, in particular the catalyser 12, heats up faster and reaches the threshold temperature sooner. In the heat-up position 34 the waste gate valve 13 is also moved to the bypass position and opened to its maximum extent, such that the exhaust gas is able to flow preferably unhindered through the bypass channel 14, bypassing the turbine wheel 7 and the variable turbine geometry 15, to the pollutant conversion system 11.

When changing over from control mode 26 to heat-up mode 31, the waste gate valve 13 is initially opened so that, when the variable turbine geometry 15 is closed beyond the minimum flow position 29 into the heat-up position 34, the turbine wheel 7 and thus the compressor wheel 8 are not undesirably accelerated and thus no undesirable charging pressure peak is generated.

After method step 32 the method returns to the first method step 25. If the temperature of the pollutant conversion system 11, in particular of the catalyser 12, is still below the threshold temperature, the variable turbine geometry 15 remains in heat-up mode 34. If the temperature of the pollutant conversion system 11 exceeds the threshold temperature, the combustion engine system 1 is operated in control mode 26.

During the change-over from heat-up mode 31 to control mode 26 the variable turbine geometry 15 is initially brought into an idling position of the control mode 26 (not shown), before the waste gate valve 13, depending on the idling position of the control mode 26, can be closed, so that the turbine wheel 7 and thus the compressor wheel 8, during opening of the variable turbine geometry 15 from the heat-up position 34 past the minimum flow position 29 into the idling position, are not undesirably accelerated, thereby generating an undesirable charging pressure peak. The idling position is that position of the variable turbine geometry 15, in which the guide elements 16 expose a gap 20 in order to reduce the exhaust gas counter-pressure.

In the heat-up position 34 shown in FIG. 4 the guide elements 16 following one another in circumferential direction 19 are in contact with each other. In this way the gap 30 present in the first position 28 between the guide elements 16 is fully closed/eliminated. The same is true of the cross-sections 20 so that the overall cross-section is reduced, in particular eliminated taking into account in particular the tolerances present in axial direction 18, so that no exhaust gas is flowing in direction of the compressor wheel 7.

In the heat-up position 34 the compressor wheel 8 is driven by the turbine wheel 7 in a reduced manner, in particular is not driven at all, so that the compressor wheel 8 throttles the fresh air flowing through the fresh air system 4. Consequently the amount of fuel in the fresh air-fuel mixture in the combustion chambers 3 is increased, so that more non-combusted fuel constituents flow into the exhaust gas system 5 and are post-combusted there, in particular upstream of the pollutant conversion system 11 and/or within the pollutant conversion system 11. In this way heating up of the pollutant conversion system 11 is further accelerated.

As revealed in FIGS. 3 and 4, the respective guide element 16/the respective guide vane 17 comprises a tip 35 facing in direction of the guide element 16 adjoining in circumferential direction 19 as well as an end section 36 remote from the tip 35. In the heat-up position 34 shown in FIG. 4 the respective tip 35 is supported on the surface of end section 36 facing the turbine wheel 7 of the guide element 16 adjacent in circumferential direction 19. In this way a closed surface in circumferential direction 19, through which the exhaust gas cannot flow, is formed with the aid of guide elements 16.

In order to also achieve, prior to reaching the threshold temperature of the pollutant conversion system 11, in particular of the catalyser 12, a reduction in pollutants present in the exhaust gas, the combustion engine system 1 may optionally comprise, as shown in FIG. 1, a pollutant conversion system 37 provided in addition to the pollutant conversion system 11, which below is also called an auxiliary pollutant reducing system 37 and which in the state shown is arranged upstream of the pollutant conversion system 11, in the example shown, further in the bypass channel 14 downstream of the waste gate valve 13. The auxiliary pollutant reducing system 37 is of smaller dimensions than the pollutant conversion system 11. In particular a catalyser 38 of the auxiliary pollutant reducing system 37, in the following also called auxiliary catalyser 38, is smaller than the catalyser 12 of the pollutant conversion system 11, which in the following is also called main catalyser 12. Consequently the required energy for reaching the threshold temperature of the auxiliary catalyser 38 is less than the corresponding energy required for reaching the threshold temperature of the main catalyser 12. Therefore the threshold temperature of the auxiliary catalyser 38 is reached quicker, so that a pollutant reduction in the auxiliary pollutant reducing system 37 begins earlier, prior to reaching the threshold temperature or the main catalyser 12.

Figure 5:
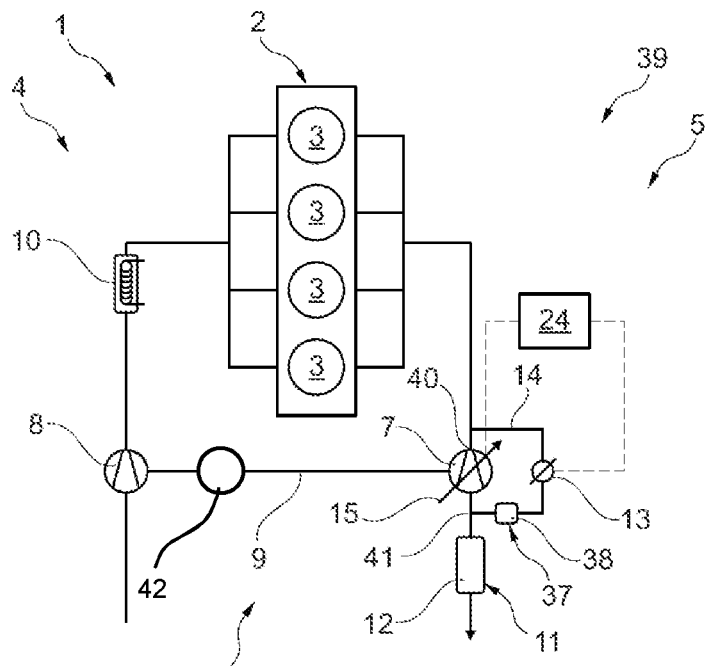
Figure 6:
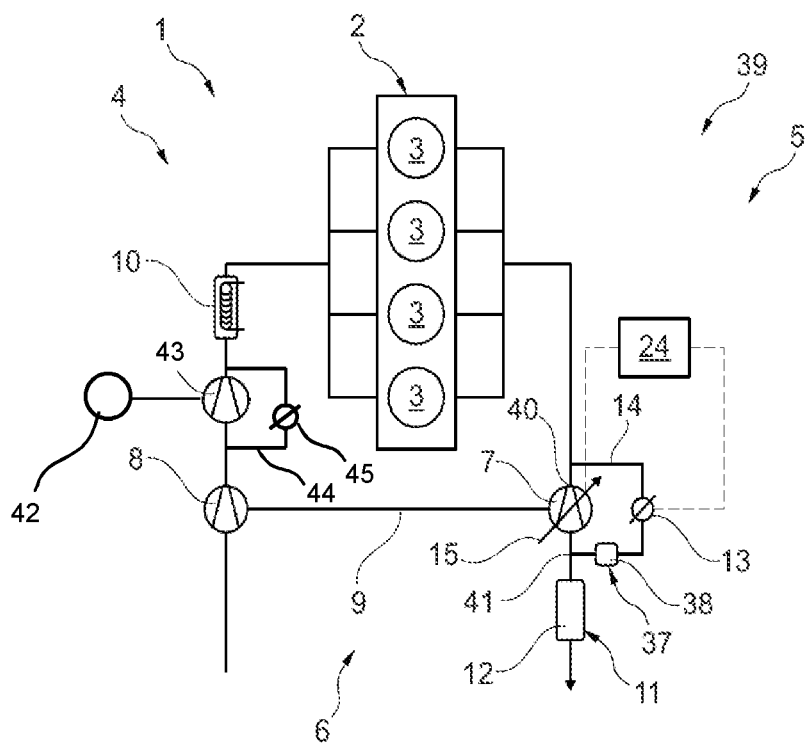

FIGS. 5 and 6 each show further exemplary embodiments of the combustion engine system 1. These exemplary embodiments are different from the exemplary embodiment in FIG. 1 in that the combustion engine system 1 additionally comprises an electric motor 42 for compressing the air in the fresh air system 4. In the exemplary embodiment shown in FIG. 5 the electric motor 42 drives the compressor wheel 8, when in operation. In the exemplary embodiment shown in FIG. 6 the electric motor 42 drives, when in operation, an additional compressor 43 which as shown in FIG. 6 can be incorporated in the fresh air system 5 downstream of the compressor wheel 8. With the exemplary embodiment in FIG. 6 an additional compressor bypass 44 bypassing the additional compressor 43 is provided, which can be optionally released and blocked via an associated additional compressor bypass valve 45.

Figure 7:
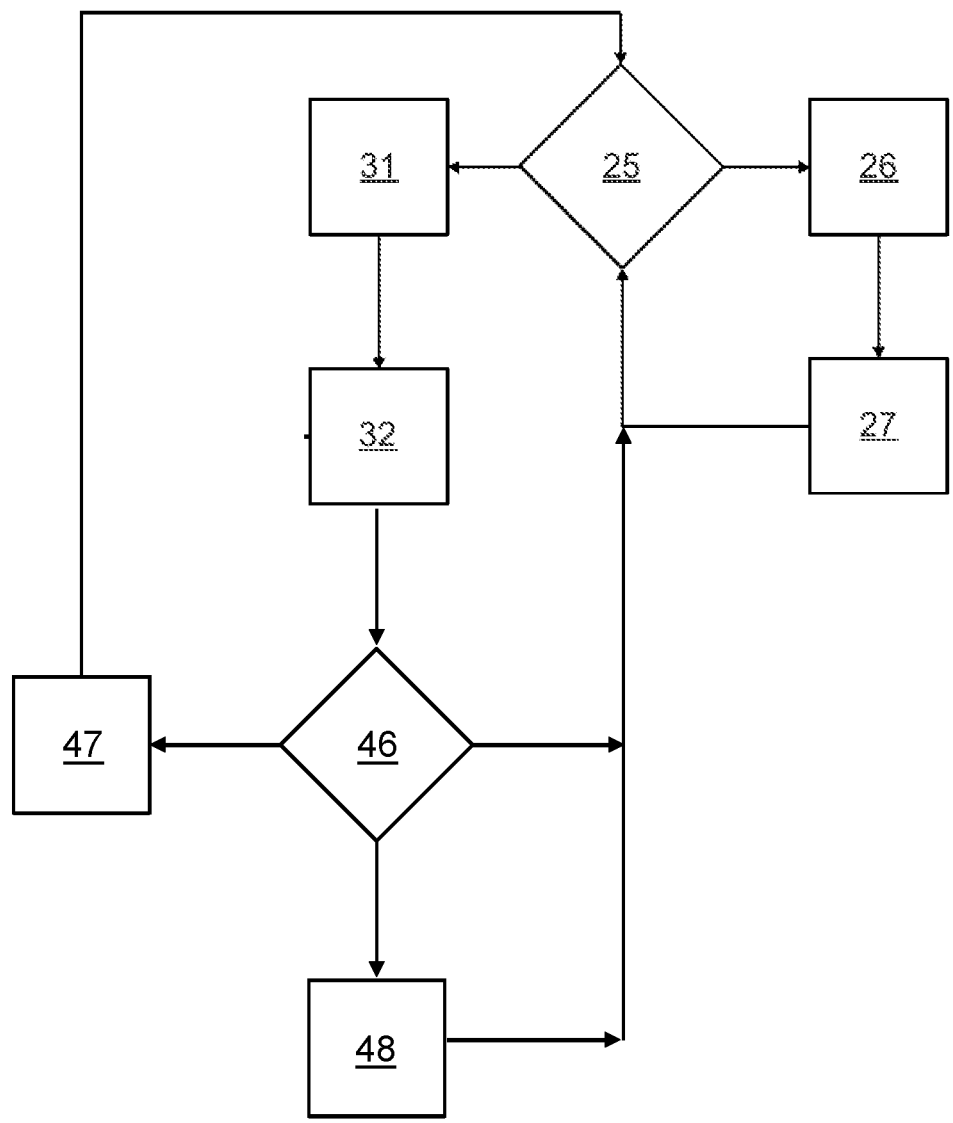

The combustion engine system 1 in the exemplary embodiments in FIGS. 5 and 6 can be operated in accordance with the flow diagram shown in FIG. 7, which is different from the flow diagram in FIG. 2 by the steps following the method step 32.

Accordingly, when in heat-up mode 31, a load requirement from the combustion engine 2 is also taken into account in a method step 46 apart from the temperature of the pollutant conversion system 11. If the load requirement is below a first threshold value, the method returns to method step 25. This means that with load requirements from the combustion engine 2 below the first threshold value the measures in method step 21 are maintained with the temperature of the pollutant conversion system 11 being checked again as per method step 25 and the process continuing as described above for FIG. 2.

If however the load requirement from the combustion engine 2 is between the first threshold value and a second threshold value which is greater than the first threshold value, an electric motor 42 is activated in a method step 47, in order to compress air in the fresh air system 4 using the compressor wheel 8 in the example of FIG. 5 and using the additional compressor 43 in the example of FIG. 6. Thereafter the method returns to method step 25, in order to check the temperature of the pollutant conversion system 11 as per method step 25 and then continue further as described above.

For a load requirement from the combustion engine 2 above the second threshold value the combustion engine system 1 is operated as per method step 48 in a conventional cold start mode. In the conventional cold start mode the waste gate valve 13 and the variable turbine geometry 15 are adjusted according to the load requirements. This means in particular that the variable turbine geometry 15, depending on the load requirement, is adjusted such that the guide elements 16, in each position, form an overall cross-section between the control minimum value and the control maximum value. The electric motor 42 can continue to be operated, in particular in the example shown in FIG. 6. Thereafter the method returns to method step 25 in order to continue the process as described above.

If in the exemplary embodiment shown in FIG. 6 the electric motor 42 is deactivated, i.e. the additional compressor 43 is not operating, the additional compressor bypass valve 45 is advantageously adjusted such that the air flows through the additional compressor bypass 44 bypassing the additional compressor 43.

If the combustion engine 2 is started and the temperature of the pollutant conversion system 11 is below the threshold value, it is preferred if in a method step not shown and performed respectively once prior to the method step, the variable turbine geometry 15, prior to starting the combustion engine 2, is placed into the heat-up position 34 and/or the waste gate valve 13 is opened.

The combustion engine system 1 may in principle be used in any application. The combustion engine system 1 is in particular part of a motor vehicle 39, in which the combustion engine 2 is used for, in addition or complementary to, driving an electrical drive not shown.

The invention claimed is:

1. A method for operating a combustion engine system, comprising:
    generating exhaust gas via a combustion engine when in operation,
    feeding fresh air via a fresh air system to the combustion engine and dissipating exhaust gas via an exhaust gas system from the combustion engine,
    operating an exhaust gas turbocharger that comprises a compressor wheel incorporated in the fresh air system for compressing the fresh air and a turbine wheel incorporated in the exhaust gas system for driving the compressor wheel,
    providing an adjustable waste gate valve of the exhaust gas turbocharger, structured and arranged in a bypass position to guide exhaust gas via a bypass channel past the turbine wheel,
    providing a pollutant conversion system incorporated in the exhaust gas system for reducing pollutants in the exhaust gas, the pollutant conversion system configured such that it has a threshold temperature above which pollutants are reduced,
    providing a variable turbine geometry of the exhaust gas turbocharger comprising adjustable guide elements surrounding the turbine wheel in a circumferential direction, the guide elements following one another in the circumferential direction and define an overall cross-section in their respective position for the exhaust gas to flow through,
    adjusting the guide elements in a control mode, where the pollutant conversion system comprises a temperature above the threshold temperature, such that the overall cross-section is between a control minimum value and a control maximum value, and operating in a heat-up mode at temperatures of the pollutant conversion system below the threshold temperature where the guide elements are moved into a heat-up position, in which the overall cross-section is smaller than the control minimum value, wherein during a change-over from the heat up mode to the control mode, adjusting the variable turbine geometry into an idling position where the guide elements expose a gap to reduce exhaust gas counter-pressure.

2. The method according to claim 1, further comprising closing the variable turbine geometry in heat-up mode such that the guide elements define a closed surface in the heat-up position in the circumferential direction.

3. The method according to claim 1, wherein the waste gate valve in heat-up mode is moved into the bypass position.

4. The method according to claim 3, wherein the waste gate valve in heat-up mode is opened to a maximum extent.

5. The method according to claim 1, further comprising compressing via an electric motor the air in the fresh air system, wherein the electric motor is operated in heat-up mode for compressing the air when a load requirement from the combustion engine exceeds a predefined first threshold value.

6. The method according to claim 5, wherein in heat-up mode, once a second threshold value of the load requirement from the combustion engine is exceeded, which is greater in comparison to the predefined first threshold value, a change-over into a conventional cold start mode takes place, in which the waste gate valve and the variable turbine geometry are adjusted in accordance with the load requirement.

7. The method according to claim 5, further comprising closing the variable turbine geometry in heat-up mode such that the guide elements define a closed surface in the heat-up position in the circumferential direction.

8. The method according to claim 1, wherein after operating in the heat-up mode, further comprising performing a check on the temperature of the pollutant conversion system and operating in the control mode when the temperature of the pollutant conversion system is above the threshold temperature.

9. A combustion engine system, comprising:
a combustion engine that produces exhaust gas when in operation,
a fresh air system for feeding fresh air to the combustion engine and an exhaust gas system for dissipating exhaust gas,
an exhaust gas turbocharger including a compressor wheel incorporated in the fresh air system for compressing the fresh air and a turbine wheel incorporated in the exhaust gas system for driving the compressor wheel,
an adjustable waste gate valve of the exhaust gas turbocharger, the waste gate valve adjustable between a closed position and a bypass position and when in the bypass position guides exhaust gas via a bypass channel past the turbine wheel,
a pollutant conversion system incorporated in the exhaust gas system for reducing pollutants in the exhaust gas,
a variable turbine geometry of the exhaust gas turbocharger, the variable turbine geometry including a plurality of adjustable guide elements surrounding the turbine wheel in a circumferential direction, the plurality of guide elements structured and arranged to follow one another in the circumferential direction and define an overall cross-section in their respective position for the exhaust gas to flow through,
a control system, the control system being communicatively connected to the exhaust gas turbocharger,
wherein the control system is configured to, in a control mode where the pollutant conversion system comprises a temperature above a threshold temperature, adjust the plurality of guide elements such that the overall cross-section is between a control minimum value and a control maximum value, and
wherein the control system is further configured to, in a heat-up mode at temperatures of the pollutant conversion system below the threshold temperature, move the plurality of guide elements into a heat-up position where the overall cross-section is smaller than the control minimum value, wherein during a change-over from the heat up mode to the control mode, adjusting the variable turbine geometry into an idling position where the guide elements expose a gap to reduce exhaust gas counter-pressure.

10. The combustion engine system according to claim 9, wherein in heat-up position adjacent guide elements of the plurality of guide elements contact each other in the circumferential direction.

11. The combustion engine system according to claim 10, wherein in heat-up position said adjacent guide elements are superimposed on each other in the circumferential direction.

12. The combustion engine system according to claim 10, wherein:
a respective guide element includes a tip facing the adjacent guide element in the circumferential direction when in heat-up mode and an end section remote from the tip, and
in heat-up position the respective guide element with the tip is supported on the end section of the adjacent guide element in the circumferential direction.

13. The combustion engine system according to claim 12, wherein in heat-up position the tip is supported on a surface of the end section facing towards the turbine wheel.

14. The combustion engine system according to claim 9, wherein the pollutant conversion system is incorporated in the exhaust gas system downstream of the turbine wheel and downstream of the bypass channel.

15. The combustion engine system according to claim 9, further comprising:
an auxiliary pollutant reducing system incorporated in the exhaust gas system such that the exhaust gas flowing through the bypass channel flows through the auxiliary pollutant reducing system,
wherein the auxiliary pollutant reducing system configured to need less thermal energy for reaching an operating temperature than the pollutant conversion system.

16. The combustion engine system according to claim 15, wherein the auxiliary pollutant reducing system is incorporated in the exhaust gas system upstream of the pollutant conversion system.

17. The combustion engine system according to claim 16, wherein the auxiliary pollutant reducing system is incorporated into the bypass channel of the exhaust gas system.

18. The combustion engine system according to claim 9, further comprising an electric motor for compressing the air in the fresh air system, wherein the electric motor drives at least one of the compressor wheel and a separate additional compressor arranged separate from the compressor wheel.

19. The combustion engine system according to claim 10, further comprising an electric motor for compressing the air in the fresh air system, wherein the electric motor drives at least one of the compressor wheel and a separate additional compressor arranged separate from the compressor wheel.

* * * * *